United States Patent
Rosal et al.

(10) Patent No.: US 7,567,059 B2
(45) Date of Patent: Jul. 28, 2009

(54) DESKTOP CHARGER FOR A PORTABLE ELECTRONIC DEVICE WITH A DISPLAY

(75) Inventors: Kim Rosal, San Diego, CA (US); Suzan Sachdeva, Depoe Bay, OR (US); George Knish, Broomfield, CO (US)

(73) Assignee: Kyocera Wireless Corp., San Diego, CA (US)

( * ) Notice: Subject to any disclaimer, the term of this patent is extended or adjusted under 35 U.S.C. 154(b) by 285 days.

(21) Appl. No.: 11/112,493

(22) Filed: Apr. 22, 2005

(65) Prior Publication Data
US 2006/0238164 A1 Oct. 26, 2006

(51) Int. Cl.
*H02J 7/00* (2006.01)
(52) U.S. Cl. ........................ 320/115
(58) Field of Classification Search .............. 320/107, 320/114, 115
See application file for complete search history.

(56) References Cited

U.S. PATENT DOCUMENTS

| 6,108,568 A * | 8/2000 | Lebrun et al. ............... 455/573 |
| 2002/0107043 A1* | 8/2002 | Adamson et al. ............ 455/550 |
| 2004/0204056 A1* | 10/2004 | Phelps, III ............... 455/556.1 |
| 2005/0024011 A1 | 2/2005 | Chen |
| 2005/0083012 A1* | 4/2005 | Lee et al. ..................... 320/114 |
| 2006/0279251 A1* | 12/2006 | Guyot et al. ................. 320/107 |

FOREIGN PATENT DOCUMENTS

JP 07074808 A * 3/1995
JP 2002135388 A * 5/2002

* cited by examiner

*Primary Examiner*—Akm E Ullah
*Assistant Examiner*—Ramy Ramadan

(57) ABSTRACT

An exemplary variable position desktop charger comprises a base, a cradle, an electrical interface, and a charger. The base and cradle are rotatably coupled such that the display of the portable electronic device can be adjusted continuously between a first angle and a second angle.

20 Claims, 3 Drawing Sheets

DESKTOP CHARGER FOR A PORTABLE ELECTRONIC DEVICE WITH A DISPLAY

FIELD OF THE INVENTION

The present invention relates to portable electronic devices. More specifically, the invention relates to charging devices for portable wireless communication devices.

BACKGROUND OF THE INVENTION

Desktop mobile phone chargers are currently known for charging a mobile phone battery situated in a cradle. US Pat. App. No. 2005/0024011 discloses a mobile phone charger in which a mobile phone is held upright by the charger, which then rests on a surface, such as a desktop. Additionally, there currently exist charging devices that provide for positioning the phone at various preset positions. US Pat. App. No. 2004/0204056 discloses a mobile phone charger in which the phone is held in position by a thumb-release latch mechanism that allows a user to position the tilt of the phone at the nearest fixed angle groove.

However, since mobile phone users come in a continuous variety of sizes, the preset tilt angles set by the manufacturer may not match the unique needs of a particular user. Moreover, there exist additional factors that are continuous in nature and cannot be predicted. For example, the particular lighting of a room may cause glare on the phone display at unanticipated angles, the sun's travel may cause glare, or the user might seek to position the display in a "sweet spot" according to his or her sitting position or even mood. Accordingly, there remains a strong need in the art to address these and other deficiencies present in known desktop charger display techniques.

SUMMARY OF THE INVENTION

A variable position desktop charger for a portable electronic device is disclosed. By way of illustration, an exemplary variable position desktop charger for a portable electronic device comprises a base, a cradle, a charger, and a variable position hinge. The hinge can be adjusted through a continuum between a first angle and a second angle. In one embodiment the first angle may be 0° and the second angle may be 90°.

According to various embodiments of the invention, one or more of the following benefits may be realized by the variable position desktop charger including, for example, a user can tailor the position of the phone display to his own size, seating position, room lighting, or any other condition that might make it desirable to reposition one's phone. In other embodiments, the variable position desktop charger may be collapsible, providing the additional benefit of being easy to transport while travelling. Finally, in some embodiments the invention may be simplified such that the cost of manufacture and assembly are reduced.

Other features and advantages of the present invention will become more readily apparent to those of ordinary skill in the art after reviewing the following detailed description and accompanying drawings.

DETAILED DESCRIPTION OF THE INVENTION

Figure 1:
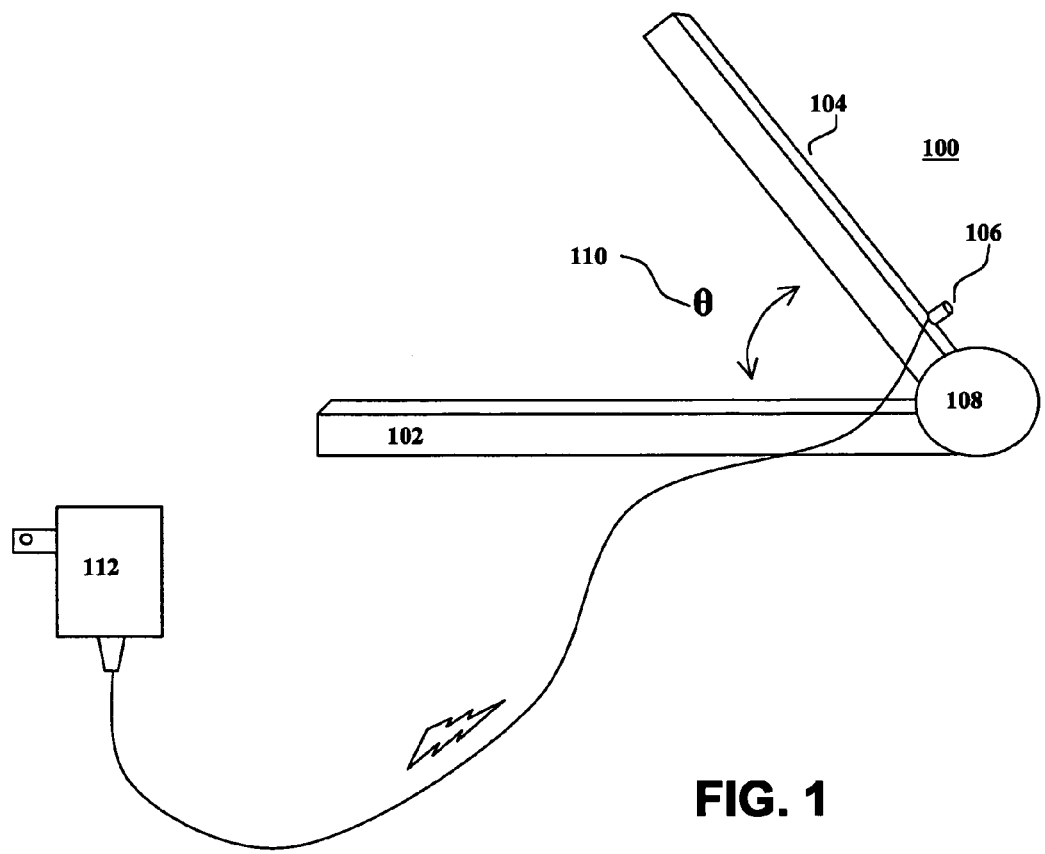
FIG. 1 illustrates a simplified block diagram of an exemplary variable position desktop charger for a portable electronic device according to one embodiment of the present invention.

Referring first to FIG. 1, there is shown a simplified block diagram of exemplary variable position desktop charger 100 for a portable electronic device (not shown) according to one embodiment of the present invention. Variable position desktop charger 100 comprises base 102, cradle 104, electrical interface 106, and battery charger 112.

Base 102 supports the remainder of the structure on a substantially horizontal surface such as a desktop. However, base 102 is not limited to this function alone. For example, base 102 may also include a storage area. The storage area may store an additional portable electronic device battery or batteries. The storage area might also store a DC charging source, an AC adapter, an accessory to the portable electronic device, etc.

In certain embodiments, base 102 may also contain circuitry such as an additional charge circuit for charging additional batteries, a charge protection circuit to prevent overcharging, a charging priority switch to select the order in which batteries will be charged (where the variable position desktop charger is configured to charge more than one battery), surge protection circuitry, a light to indicate charge status, communication interface (i.e., data cable plugs), etc.

Electrical interface 106 and battery charger 112 supply power to the portable electronic device. The battery charger may be a fixed power supply, such as wired AC or DC power supply, for example, or a portable power supply, such as DC batteries.

Figure 2:
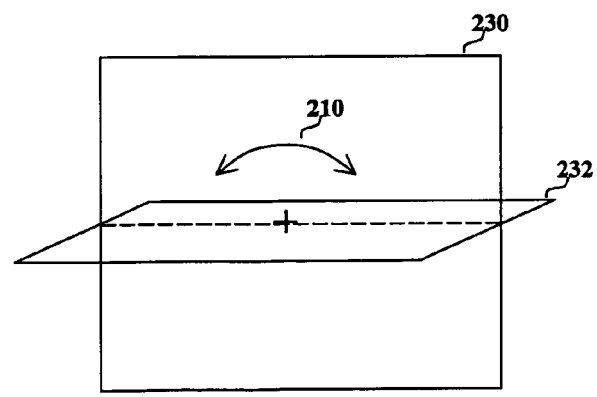
FIG. 2 illustrates the plane of rotation of the portable electronic device relative to the surface on which an exemplary variable position desktop charger rests.

Referring also to FIG. 2, cradle 104 is rotatably coupled to base 102 and configured to statically hold the portable electronic device at continuously adjustable positions 110, rotating through a range 210 between a first and a second angle. Range of rotation 210 defines plane 230. FIG. 2 illustrates plane of rotation 230 of the cradle, perpendicular to resting plane 232 of base 102 according to one embodiment of invention.

Figure 3:
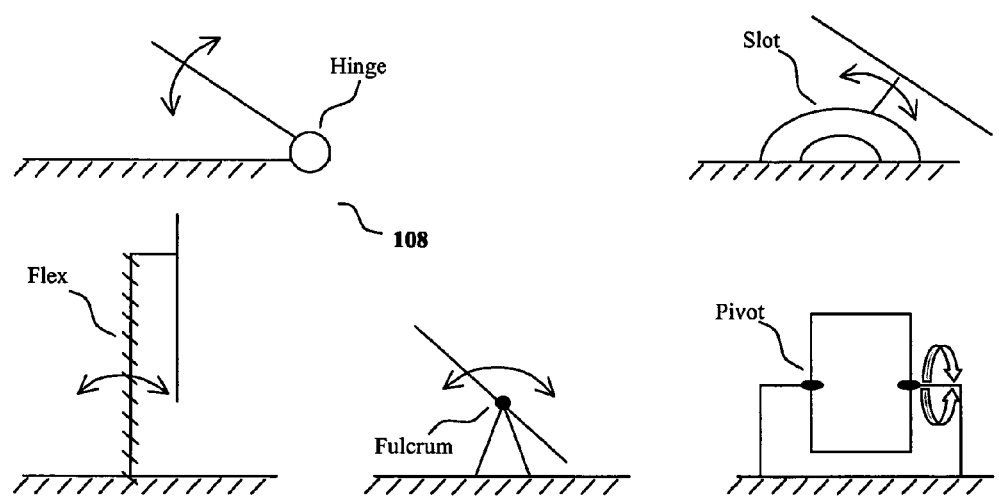
FIG. 3 schematically illustrates exemplary methods of rotatably coupling the cradle of the present invention to its base where the cradle has continuously adjustable positions between a first and a second angle.

As shown in FIG. 3, cradle 104 may be rotatably coupled to base 102 by various different means such that the display of the portable electronic device is capable of being be adjusted through a continuum of angles between a first angle and a second angle, within the plane of rotation. Although, FIG. 3 illustrates several exemplary methods of rotatably coupling a cradle to a base, the particular embodiment depicted in FIG. 1 employs friction hinge 108 to rotatably couple the cradle to the base. Such a configuration will add collapsibility, portability, and simplicity of manufacture.

It is noted that cradle 104 is not limited to any particular method of holding the portable electronic device. For example, structures such as, but not limited to slots, pockets, clamps, spring-loaded quick release, straps, brackets, etc. may be implemented to hold the portable electronic device. In this way, the cradle is capable of holding the portable electronic device in a static position anywhere within the variable position desktop charger's range of rotation 210.

Figure 4:
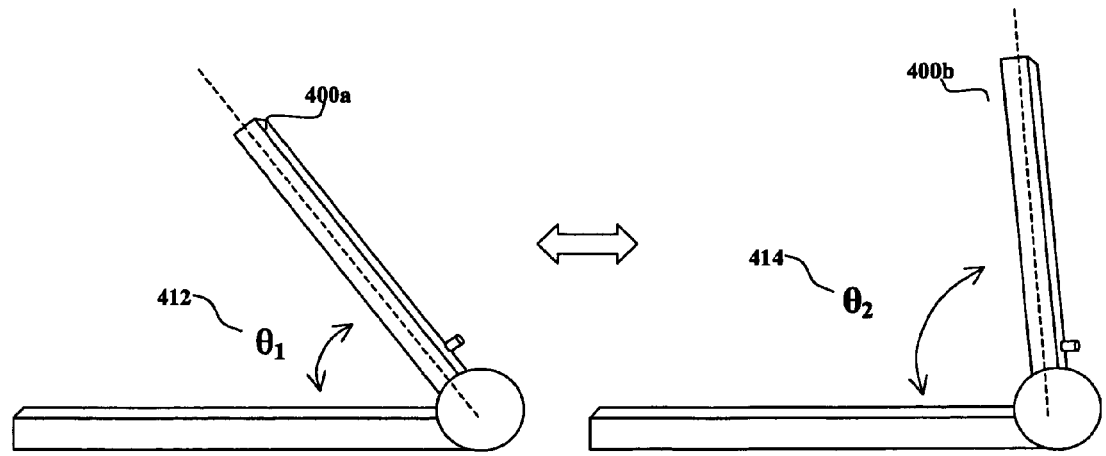
FIG. 4 illustrates an exemplary variable position desktop charger adjusted to statically hold the portable electronic device at a first angle and a second angle according to one embodiment of the present invention.

Referring now to FIG. 4, there is shown an exemplary variable position desktop charger, adjusted to statically hold the portable electronic device (not shown) at first angle 412 and second angle 414 according to one embodiment of the present invention. According to this embodiment, the portable electronic device would be secured to the cradle and fixed in first position 400a corresponding to first angle 412. As desired by the user, the portable electronic device could then be repositioned and fixed to second position 400b corresponding to second angle 414.

Similarly, the portable electronic device could be fixed, or statically held, to any other angle between first angle 412 and second angle 414. One benefit of this arrangement is that a user can tailor the position of the phone display to his own size, seating position, room lighting, or any other condition that might make it desirable to reposition the phone and view its display.

It should be appreciated that the choice of first and second angles 412, 414 is not limited to any particular first and second angle, or any particular range. For example, in one embodiment first and second angles 412, 414 may represent an optimal viewing range, such as 7° to 50°, whereas, in another embodiment, first and second angles 412, 414 may represent an absolute viewing range for a portable electronic device, such as 0° to 90°.

Figure 5:
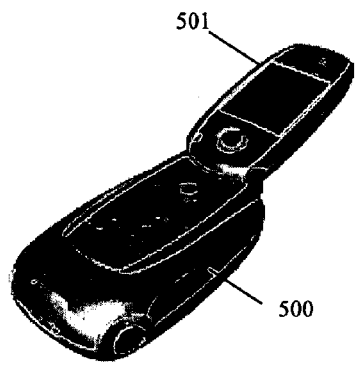
FIG. 5 illustrates an exemplary variable position desktop charger according to another embodiment of the present invention.

The range of the variable position desktop charger may also depend on the particular portable electronic device that is to be held. FIG. 5 shows exemplary variable position desktop charger 500 wherein the portable electronic device 501 is a swivel mobile phone, which has both a retracted and deployed position. Here, the display view angle of swivel mobile phone 501, when deployed, is slightly offset compared to its display view angle when retracted. However, the swivel mobile phone's display would be parallel to its body when in its retracted position (not shown).

In this situation, the range between the first angle and the second angle of variable position desktop charger 500 might reflect the alternate viewing ranges for the portable electronic device in its retracted and deployed positions. For example, if it were determined that the optimal viewing range of the display was 15° to 60° and the offset of deployed portable electronic device display is 10°, the first and second angles of variable position desktop charger 500 could be set as 5° and 50°. As such, variable position desktop 500 charger would provide for optimal viewing of the portable electronic device in both its retracted and deployed configurations.

Figure 6:
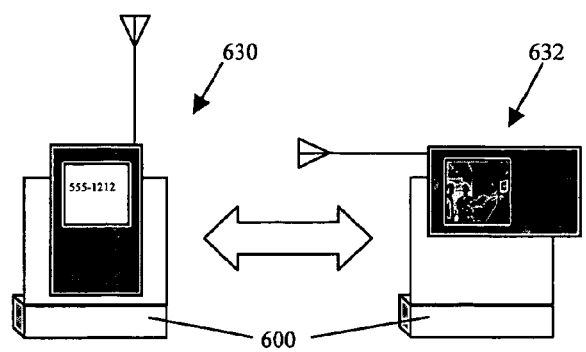
FIG. 6 illustrates an exemplary variable position desktop charger according to another embodiment of the present invention.

According to another embodiment of the invention, the portable electronic device may be reoriented while being held by the variable position desktop charger. Many portable electronic devices incorporate displays that can be viewed from more that one orientation. For example, FIG. 6 illustrates a mobile phone that displays call data when in a vertical orientation 630, but can also display video in a horizontal orientation 632. Thus, variable position desktop charger 600 may be further configured to orient a portable electronic device vertically and horizontally, relative to the plane of the cradle.

Figure 7:
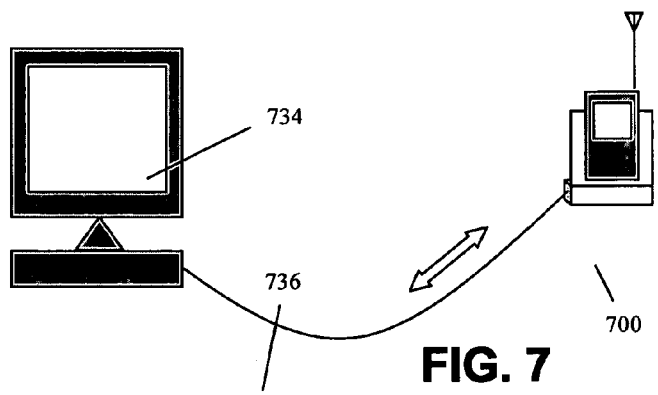
FIG. 7 illustrates an exemplary variable position desktop charger communicably coupled to a computer according to one embodiment of the present invention.

Referring next to FIG. 7, exemplary variable position desktop charger 700 communicably coupled to computer 734 is shown according to one embodiment of the present invention. In this illustration, variable position desktop charger 700 also includes communications interface 736, thus permitting the portable electronic device to communicate and be used while being charged. It should be understood that said communications would equally be enabled when the portable electronic device is operating under its own power.

According to another embodiment, the variable position desktop charger may allow multiple configurations of the portable electronic device. For example, wireless communication devices are known that use an extended-life battery. Such batteries often are bulky and protrude from the normal contour of the wireless communication device.

Figure 8:
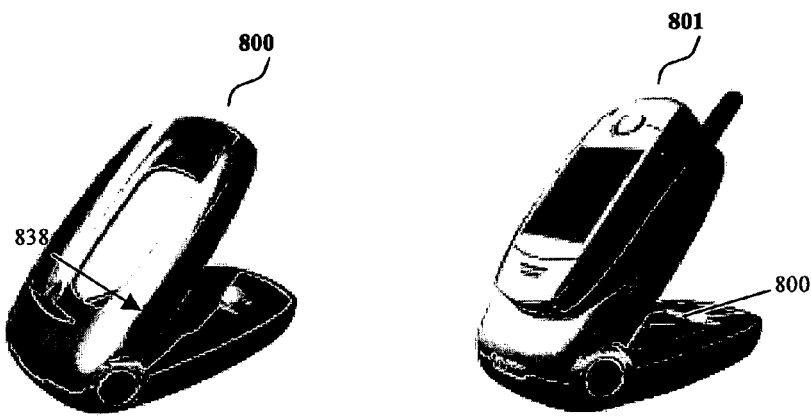
FIG. 8 illustrates an exemplary variable position desktop charger holding a wireless communication device according to one embodiment of the present invention.

FIG. 8 illustrates exemplary variable position desktop charger 800 holding wireless communication device 801, wherein the cradle is also configured to accommodate a protruding battery through void 838 in the cradle. In addition to being versatile for various mobile phone configurations, this feature can offer an additional benefit of decreased weight and increased transportability. The wireless communication device 801 includes an extended life battery that protrudes rearward from a rear of the wireless communication device 801. The cradle includes a rear wall with the void 838 forming a cavity that accommodates the extended life battery that protrudes rearward from the rear of the wireless communication device 801 when the wireless communication device 801 is in the variable position desktop charger 800.

From the above description of exemplary embodiments of the invention, it is manifest that various techniques can be used for implementing the concepts of the present invention without departing from its scope. Moreover, while the invention has been described with specific reference to certain embodiments, a person of ordinary skill in the art would recognize that changes could be made in form and detail without departing from the spirit and the scope of the invention.

What is claimed is:

1. A variable position desktop charger for a portable electronic device having a display, the desktop charger comprising:

a base;

a hinge configurable to rotate between a first angle and a second angle;

a cradle connected to the base through the hinge to rotatably couple the cradle to the base, the cradle configured to statically hold the portable electronic device display at continuously adjustable positions determined by a hinge angle of the hinge between the first and the second angle, the cradle defining a plane and configured to allow the portable electronic device display to be rotated within the plane to orientate the portable electronic device display in at least two orientations relative to the cradle within the plane of the cradle while the cradle is fixed at one of the positions corresponding to the hinge angle between the first and the second angle and the portable electronic device is charged by the variable position desktop charger;

an electrical interface configured to interface with and transmit charge to the portable electronic device when the portable electronic device is attached to the cradle in the at least two orientations; and a battery charger electrically coupled to the electrical interface.

2. The desktop charger of claim 1 wherein the range between the first angle and the second angle defines an optimal viewing range for the portable electronic device.

3. The desktop charger of claim 2 wherein the portable electronic device has a retracted and deployed position; and wherein the range between the first angle and the second angle further defines an alternate viewing range for the portable electronic device in its retracted and deployed positions.

4. The desktop charger of claim 1 wherein the first angle is 0° and the second angle is 90°.

5. The desktop charger of claim 1 wherein the cradle can secure the portable electronic device in a vertical orientation and a horizontal orientation.

6. The desktop charger of claim 1 further comprising a communications interface configured to communicably couple with the portable electronic device.

7. The desktop charger of claim 1 wherein the portable electronic device comprises a wireless communications device.

8. A variable position desktop charger for a portable electronic device comprising:
    means for holding the portable electronic device;
    means for rotating the holding means through a continuous range between a first angle and a second angle;
    means for supporting the holding means on a resting surface, the holding means connected to the support means through the rotating means to rotatably couple the holding means to the supporting means, the holding means configured to statically hold the portable electronic device display at continuously adjustable positions determined by a rotating means angle of the rotating means between the first and the second angle, the holding means defining a plane and configured to allow the portable electronic device display to be rotated within the plane to orientate the portable electronic device in at least two orientations relative to the holding means within the plane of the holding means while the holding means is fixed at one of the positions corresponding to the rotating means angle between the first and the second angle and the portable electronic device is charged by the variable position desktop charger;
    means for securing the position of the portable electronic device at any position within the range; and
    means for electrically coupling with and charging the portable electronic device in the at least two orientations.

9. The desktop charger of claim 8 wherein the range between the first angle and the second angle defines an optimal viewing range for the portable electronic device.

10. The desktop charger of claim 9 wherein the portable electronic device has a retracted and deployed position; and
    wherein the range between the first angle and the second angle further defines an alternate viewing range for the portable electronic device in its retracted and deployed positions.

11. The desktop charger of claim 8 wherein the first angle is 0° and the second angle is 90°.

12. The desktop charger of claim 8 wherein the holding means can secure the portable electronic device in a vertical orientation and a horizontal orientation.

13. The desktop charger of claim 8 further comprising means for communicably coupling the portable electronic device with a computer.

14. The desktop charger of claim 8 wherein the portable electronic device comprises a wireless communications device.

15. The desktop charger of claim 1 wherein the cradle is configured to statically hold the portable electronic device with at least one of slots, pockets, clamps, spring-loaded quick releases, straps, and brackets.

16. The desktop charger of claim 8 wherein the holding means is configured to statically hold the portable electronic device with at least one of slots, pockets, clamps, spring-loaded quick releases, straps, and brackets.

17. The desktop charger of claim 1 wherein the electrical interface is configured to interface with and transmit charge to the portable electronic device when the portable electronic device display is orientated in the at least two orientations relative to the fixed cradle within the plane of the cradle.

18. The desktop charger of claim 8 wherein the means for electrically coupling is configured to interface with and transmit charge to the portable electronic device when the portable electronic device display is orientated in the at least two orientations relative to the fixed holding means within the plane of the holding means.

19. The desktop charger of claim 1, wherein at least one of the first angle and the second angle corresponds to a collapsed cradle position positioning a base edge of the base adjacent to a cradle edge of the cradle and positioning the cradle substantially parallel to the base.

20. The desktop charger of claim 1, wherein the cradle having a cavity formed therein that accommodates a protruding battery from the portable electronic device within the cavity.

* * * * *